United States Patent [19]
Herring et al.

[11] 3,950,783
[45] Apr. 13, 1976

[54] DISK FILE ACCESS MECHANISM

[75] Inventors: George Deems Herring, San Jose, Calif.; David Ronald Wilson, Rochester, Minn.

[73] Assignee: International Business Machines Corporation, Armonk, N.Y.

[22] Filed: Jan. 6, 1975

[21] Appl. No.: 538,627

[52] U.S. Cl. .................... 360/78; 360/75; 360/106
[51] Int. Cl.² ............ G11B 21/08; G11B 21/12; G11B 21/02; G11B 5/55
[58] Field of Search ........... 360/75, 78, 98, 99, 105, 360/106

[56] References Cited
UNITED STATES PATENTS
3,838,462 9/1974 Barbeau et al. .................... 360/99

Primary Examiner—Robert S. Tupper
Attorney, Agent, or Firm—Keith T. Bleuer

[57] ABSTRACT

An access mechanism for a vertical stack of magnetic disks including a mechanism carriage moveable back and forth horizontally by a prime mover, an access arm having a magnetic head adjacent its end and carried by a carriage moveable along slide shafts mounted in the mechanism carriage at an angle with respect to horizontal and a stop against which the access arm carriage moves whereby the access arm moves vertically along the periphery of the disk stack as the movement of the mechanism carriage progresses after contact of the access arm carriage with the stop. A pawl carried by the mechanism carriage coacts with ratchet teeth carried by the access arm carriage for holding the access arm and magnetic head at selected vertical positions so that the access arm and head may be moved between a selected pair of disks in the stack by movement of the mechanism carriage in the opposite direction.

6 Claims, 7 Drawing Figures

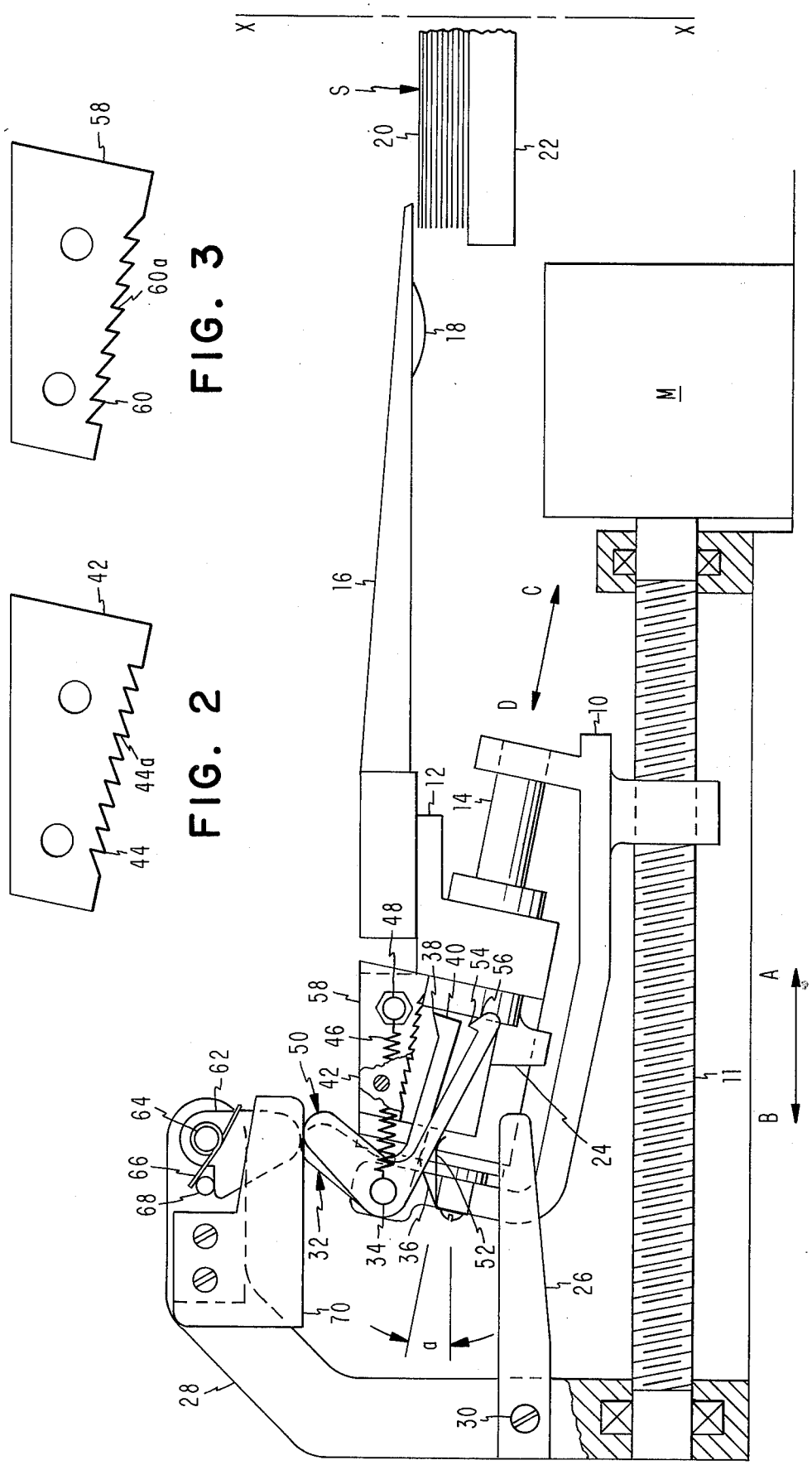

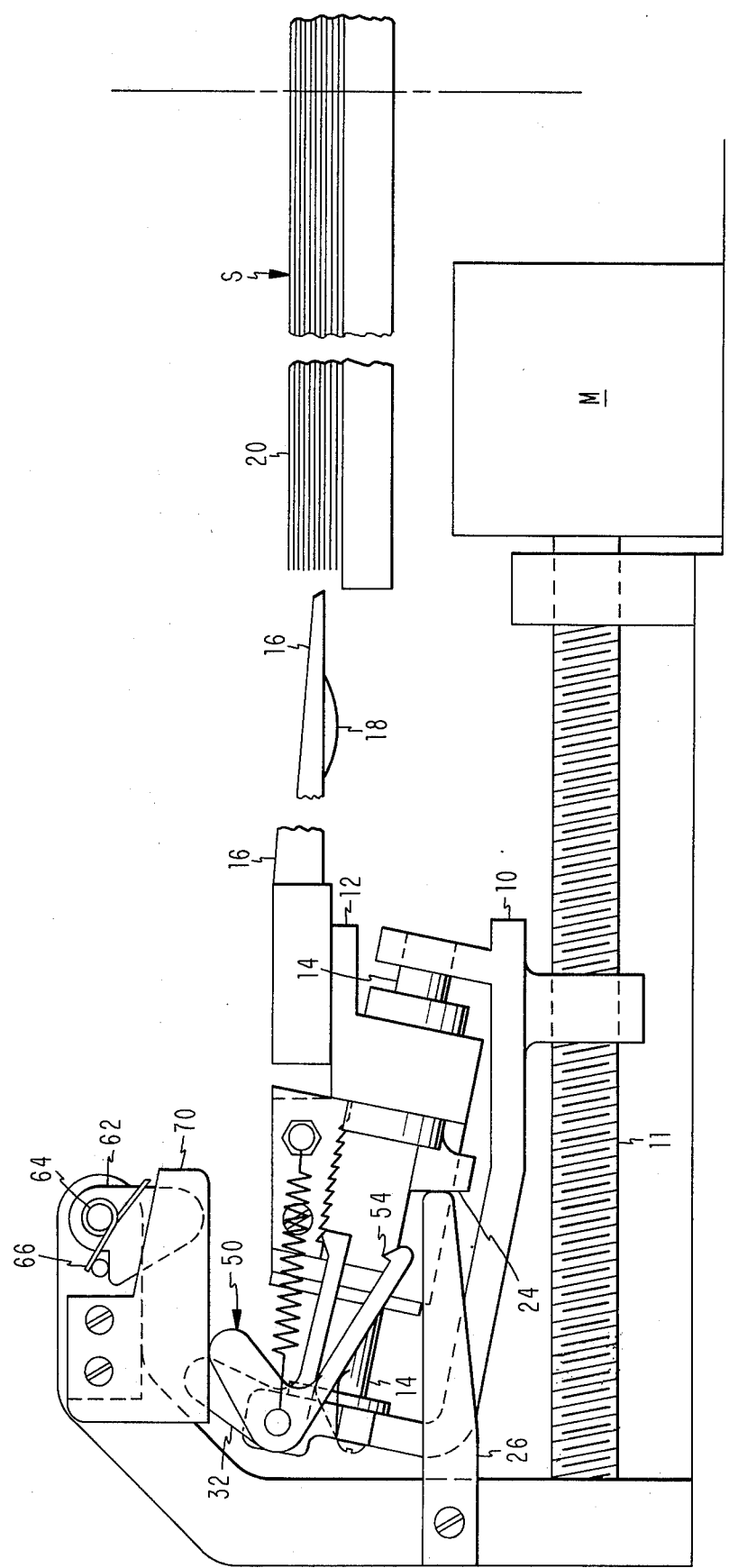

DISK FILE ACCESS MECHANISM

BACKGROUND OF THE INVENTION

The invention relates to magnetic disks and more particularly to accessing mechanism for the disks whereby an access arm and a magnetic head carried thereby may be moved between a selected pair of disks in a vertical stack.

It has previously been common practice to utilize separate prime movers for positioning an access arm and a magnetic head with respect to a vertical stack of magnetic disks for the vertical and horizontal movements necessary for the access arm and head. The vertical movement is necessary for access to a specific disk in the stack, and the horizontal movement is necessary to access the track area of that disk for reading and writing information. Such separate prime movers may include separate electric motors of the stepping type and lead screw mechanism attached to each of the motors.

SUMMARY OF THE INVENTION

It is an object of the present invention to provide improved mechanism for moving an access arm and a magnetic head with respect to a vertical stack of magnetic disks in both the vertical and horizontal directions utilizing only a separate prime mover or motor.

It is another object of the invention to provide such an improved mechanism in which the single motor is effective to move a mechanism carriage in one direction and in which interconnecting mechanism is provided between the mechanism carriage and the access arm so that this movement in one direction of the mechanism carriage is effective to move the access arm vertically alongside of the vertical stack of magnetic disks. It is also an object to provide such a mechanism in which the construction is such that on a subsequent movement of the mechanism carriage in the opposite direction, the access arm and magnetic head are moved horizontally into a selected space between a pair of consecutive disks in the stack.

A preferred form of the invention includes a single motor and lead screw for moving a mechanism carriage in opposite horizontal directions, an access arm and magnetic head mounted by means of an access arm carriage on a plurality of slide shafts carried by the mechanism carriage and extending at an acute angle with respect to horizontal whereby the access arm and head may be effectively moved vertically by sliding the access arm carriage on the slide shafts, a stop against which the access arm carriage may be moved with movement of the carriage in one horizontal direction whereby the access arm carriage moves along the slide shafts, and a pawl and ratchet tooth mechanism for holding the access arm carriage in an adjusted position on the slide shafts and thus holding the access arm in an adjusted vertical position so that, when the mechanism carriage is moved in the opposite horizontal direction, the access arm and magnetic head are moved into a predetermined selected position in the vertical stack of disks.

BRIEF DESCRIPTION OF THE DRAWINGS

FIG. 1 is a side elevational view of a disk file access mechanism utilizing the principles of the invention and including a pair of plates which are toothed on one edge for holding a disk file access arm in different adjusted positions;

FIGS. 2 and 3 are side elevational views on enlarged scales of the plates above referred to;

FIGS. 4 and 5 are side elevational views similar to FIG. 1 but with the parts of the disk file access mechanism shown in different positions;

DESCRIPTION OF THE PREFERRED EMBODIMENT

Figure 5:
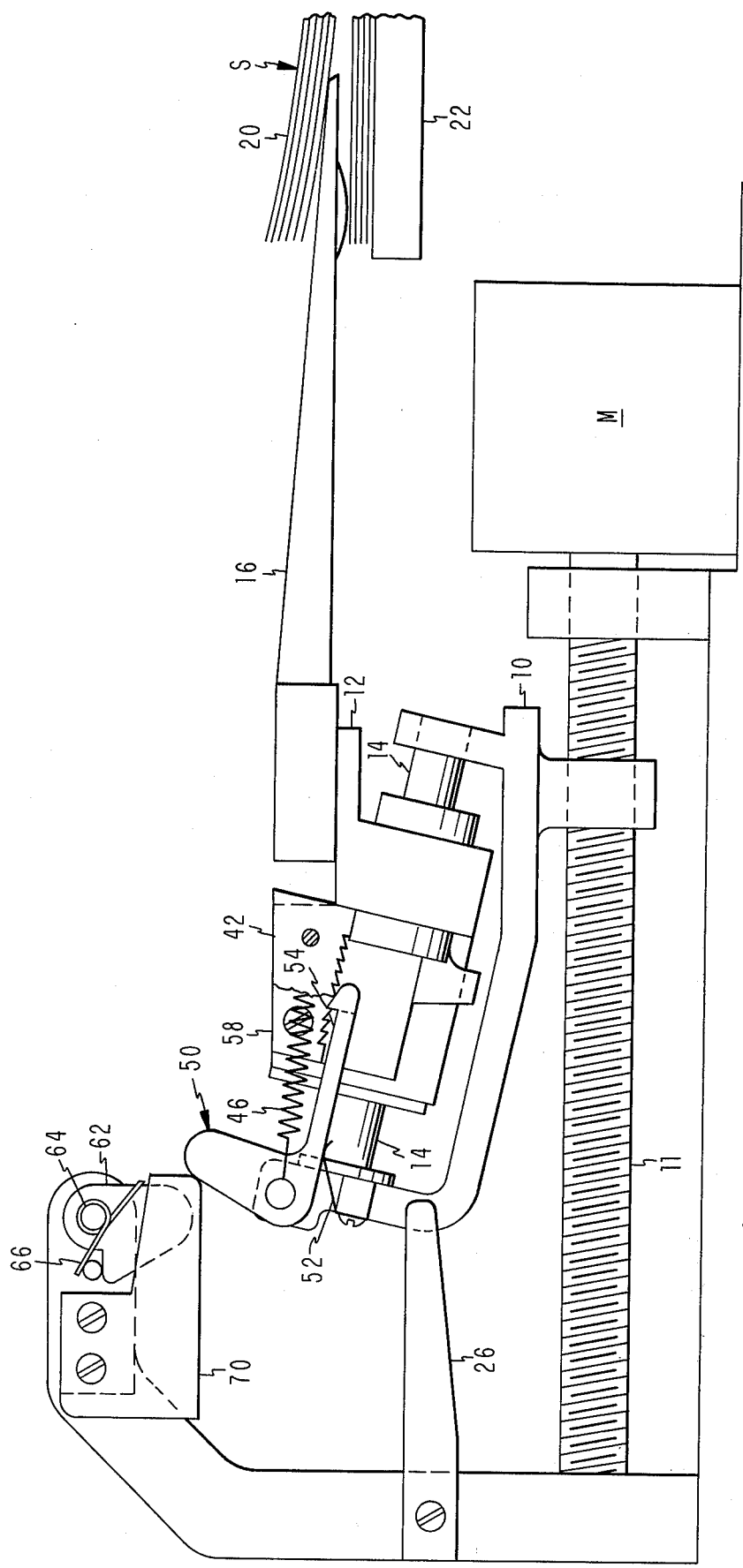
Figure 6:
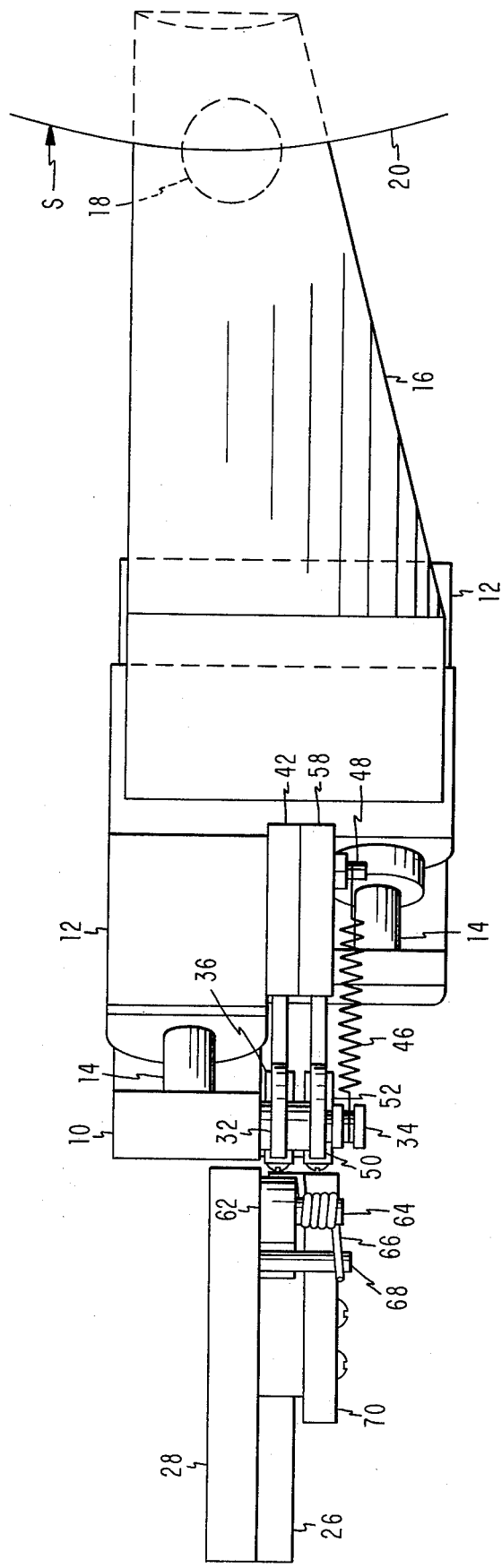
FIG. 6 is a top plan view of the disk file access mechanism.

Referring to FIGS. 1–6, the embodiment of the invention therein illustrated may be seen to comprise a mechanism carriage 10 that is movable horizontally in opposite directions A and B. The carriage 10 may be constrained to move in a certain horizontal path by suitable guideways (not shown). An electric motor M preferably of the electrical stepping type driving a lead screw 11 may be utilized for moving the carriage 10 in the directions A and B. An access arm carriage 12 is movably disposed on the carriage 10. In particular, the carriage 12 is slideably disposed on slide shafts 14 which are carried by and are fixed with respect to the carriage 10. The shafts 14 extend at an acute angle $a$ with respect to horizontal and with respect to the directions A and B in which the carriage 10 is constrained to move, so that the access arm carriage 12 moves in the oblique directions C and D with respect to the carriage 10 and directions A and B.

An access arm 16 is fixed with respect to the carriage 12 and has a magnetic read/write transducer or head 18 on its lower surface adjacent its end. A stack S of magnetic disks 20 is disposed in proximity with the end of the access arm 16. The disks 20 are disposed on a table 22 that may be either stationary or rotatable, and the disk stack S is driven by any suitable means (not shown) and rotates on an axis X—X that is vertical and extends at right angles to directions A and B.

The access arm carriage 12 is provided with a vertical abutment surface 24 which is adapted to abut against the end of an access arm carriage stop 26. The stop 26 is fixed with respect to any suitable stationary part, such as the standard 28, being fixed to the standard 28 by means of a screw 30. The stop 26 is held with respect to the standard 28 to be horizontal.

A pawl 32 in the form of a bell crank is pivotally mounted on the carriage 10 by means of a shaft 34, and a leaf spring 36 is fixed with respect to the carriage 10 and bears against the pawl 32 to urge the pawl 32 to rotate in the counterclockwise direction as seen in FIG. 1. The pawl 32 has a tooth 38 on its end formed in part by the flat end 40 of the pawl 32. A plate 42 is fixed to the carriage 12 and is provided with ratchet teeth 44 with which the pawl 32 may engage. The teeth 44 have tooth surfaces 44a that extend in the same direction as the pawl end 40 when the tooth 38 of the pawl interengages with the teeth 44. An extension spring 46 extends between the shaft 34 and a pin 48 fixed with respect to the carriage 12.

Another pawl 50 in the form of a bell crank is swingably disposed on the shaft 34, and a leaf spring 52 is fixed to the carriage 12 and bears on the pawl 50 in such a manner as to tend to rotate the pawl 50 in the counterclockwise direction as seen in FIG. 1. The pawl 50 has a tooth 54 which is formed in part by a cam surface 56 on the end of the pawl 50. A plate 58 is fixed to the carriage 12 and has teeth 60 with which the tooth 54 on the pawl 50 cooperates. The teeth 60 have surfaces 60a that extend in the same direction as the tooth surfaces 44a; however, as will be seen from FIGS. 2 and 3, the slanted portions of the teeth 60 extend oppositely with respect to the slanted portions of the teeth 44.

A pawl knockoff lever 62 is swingably mounted by means of a shaft 64 with respect to the standard 28. A spring 66 extends around the shaft 64 and between a stop 68 fixed to the standard 28 and the lever 62 for the purpose of holding the lever 62 yieldably against the stop 68. A cam plate 70 of the form shown is fixed to the standard 28 alongside of the lever 62.

In operation, it may be assumed first that the access arm carriage 12 and the access arm 16 are in their home height positions when the arm 16 is located at a height above that of the uppermost disk 20 of the disk stack S as is shown in FIG. 1. The access arm 16 is positioned at any other disk height by moving the entire mechanism, including the two carriages 10 and 12 in direction B toward the fixed carriage stop 26 until the abutment surface 24 on the carriage 12 contacts the end of the stop 26. During preliminary movement of the carriage 10 in direction B, prior to a contacting of the stop 26, the carriage 12 is at the uppermost limit of its movement on the slide shafts 14, being held in such position by the spring 46. On continued movement of the carriage 10 in the direction B after the abutment surface 24 has contacted the end of the stop 26, the carriage 10 continues to move in the direction B but without any corresponding movement of the carriage 12, so that the carriage 12 moves down the slide shafts 14 with a continued extension of the spring 46 (see FIG. 4). The end of the access arm 16 during this movement of the carriage 10 in the direction B is outside of the outer periphery of the stack S of disks 20; and carriage 12 and access arm 16 thus move downwardly, with the end of the arm 16 travelling along the outer periphery of the disk stack S. When the desired vertical location of the access arm 16 is reached, motion of the carriage 10 in the direction B is stopped. During the downward movement of the carriage 12 and arm 16, the pawl 32 loaded by the spring 36 against the teeth 44 has moved up the series of teeth 34 with its tooth 38 ratcheting over the teeth 44; and the pawl 32 is now set to hold the carriage 12 and access arm 16 in the positions desired along the slide shafts 14 and at the desired height.

It should be noted that each of the teeth 44 corresponds with a specific disk 20 in the disk stack S. In this connection, it may be mentioned that the disks 20 are preferably thin and flexible and may be made of polyethylene terephthalate and may, for example, have a thickness of about 0.003 inch. Spacers of about 0.007 inch thickness may be disposed between the disks 20 at the inner peripheries of the disks, so that, when the disks 20 are in rotation, there is a space of about 0.007 inch between consecutive disks at the peripheries of the disks. The selected vertical position of the carriage 12 and access arm 16 is maintained by the pawl tooth 38 engaging with one of the ratchet teeth 44 and particularly with one of the tooth surfaces 44a, so that the pointed end of the access arm 16 lies exactly opposite one of the 0.007 inch spaces between consecutive disks 20.

During this time of adjustment of the vertical height of the carriage 12 and arm 16, the cam plate 70 engages with the pawl 50 and holds the pawl 50 in its position as illustrated in FIG. 4 in which the pawl tooth 54 is out of engagement with any of the teeth 60.

With the access arm carriage 12 and arm 16 being thus fixed with respect to the carriage 10 due to the engagement of the pawl 32 with one of the ratchet teeth 44, the arm 16 is moved into the selected space between consecutive disks 20 by reversing the direction of movement of the carriage 10 so that it moves in the direction A. As the carriages 10 and 12 and access arm 16 move in the direction A, the access arm 16 and the magnetic head 18 move into the selected space between consecutive disks 20 in disk stack S; and the magnetic head 18 cooperates with the lowermost disk of the two consecutive disks for a magnetic reading or writing action with respect to the latter disk (see FIG. 5). The head 18 is stepped from one data track to the next on this disk by moving the mechanism carriage 10 and thereby the access arm 16 horizontally, using the motor M driving the lead screw 11.

In the movement of the carriage 10 in the direction A, the pawl 50 leaves the cam plate 70; and the pawl 50 engages with the one of the ratchet teeth 60 (particularly its face 60a) that corresponds with the one of the ratchet teeth 44 engaged by the pawl tooth 38. The teeth 38 and 54 are preferably in line looking at the mechanism in side elevation as in FIG. 5. The two pawls 32 and 50, being both engaged under these circumstances, hold the carriage 12 fixed on the shafts 14 and fixed with respect to the carriage 10 so that the arm 16 remains in its vertical position as selected by the degree of movement given the carriage 10 in the direction B as previously described. When the movement of the carriage 10 in the direction A is stopped with the proper track on a disk 20 having been reached, the carriage 10 will not move any farther downwardly on the shafts 14 due to the inertia effect of the carriage 12 and arm 16, since the pawl 50 is in engagement with one of the teeth 60. A fast accessing operation of the arm 16 and head 18 is thus obtained.

In order to withdraw the access arm 16 from the disk stack S and select another disk 20; the entire mechanism, including the carriages 10 and 12 and arm 16, is moved away from the disk stack S using motor M. The pawl 32 eventually strikes the pawl knockoff lever 62, and the pawl 32 is rotated by the lever 62 in the clockwise direction as seen in FIG. 1 against the action of the spring 36. The pawl 32 is thus disengaged from the pawl tooth 44 with which the tooth 38 was engaged. At substantially the same time, the cam plate 70 is effective on the pawl 50 to rotate the pawl 50 in the clockwise direction as seen in FIG. 1 so that both of the pawls 32 and 50 are disengaged from the respective ratchet teeth 44 and 60. The spring 46 is then effective to pull the carriage 12 upwardly along the slide shafts 14 to the uppermost limit of movement of the carriage 12 on the shafts 14. The access arm 16 is thus moved upwardly along the periphery of the stack of disks 20 to be at its original height as seen in FIG. 1. Movement of the carriage 10 is continued until the carriage 12 again reaches the stop 26 and the next selected disk height is reached.

It should be noted that the pawl 32 strikes the pawl knockoff lever 62 as the access arm 16 is moved back into the pack of disks 20, but the knockoff lever 62 is free to pivot out of the way of the pawl 32 moving in the direction A. Thus the pawl 32 remains in engagement with the selected tooth 44 and tooth face 44a as was determined by the amount of movement given the carriage 10 in the direction B; and the knockoff lever 62 provides no interference with the access operation in which the access arm 16 is moved between an adjacent pair of disks 20 in the pack.

As was previously mentioned, FIG. 1 illustrates the condition of the parts of the mechanism in which the access arm 16 is at its home height position. The mechanism, and particularly the carriages 10 and 12, may be considered to be moving in the direction B in this figure. The pawl 32 is at this time passing directly beneath the maximum radius portion of the knockoff lever 62, disengaging the pawl 32 with respect to the teeth 44. The cam plate 70 is also effective to disengage the pawl 50 with respect to the teeth 60. Thus, both of these pawls are disengaged with respect to the respective ratchet teeth 44 and 60, and the spring 46 is effective to move and hold the carriage 12 to the limit of its movement upwardly on the slide shafts 14. FIG. 4 illustrates the positions of the parts of the mechanism when the carriages 10 and 12 move farther in the direction B to a limit of their movement at which a particular lower disk 20 in the disk stack S is selected. The abutment surface 24 has contacted the stop 26, and the stop 26 has moved the carriage 12 downwardly along the slide shafts 14. The pawl 32 has moved beyond the knockoff lever 62 so that the tooth 40 ratchets along the teeth 44 during this movement of the carriage 12 along the slide shafts 14. At the end of the movement of the carriage 10 in the direction B, the pawl tooth 40 engages a particular tooth 44 corresponding to the particular disk 20 that it is desired the transducer 18 contact. FIG. 5 illustrates the positions of the parts of the mechanism under the condition in which the carriage 10 has been moved a distance in the direction B sufficient to select an intermediate disk 20 in the disk stack S. The pawl 32 is, under these conditions, in engagement with the face 44a of an intermediate ratchet tooth 44. The carriages 10 and 12 and the arm 16 are moving in the direction A, and both the knockoff lever 62 and the cam plate 70 are ineffective, since the carriages 10 and 12 have moved a sufficient distance in direction A. Both of the pawls 32 and 50 engage with their respective teeth 44 and 60 under these conditions. As previously explained, under these conditions the pawl 50 engages with one of the teeth 60 so as to prevent an overshoot of the access arm 16 and read/write head 18 with respect to the desired track on a disk 20.

Figure 7:
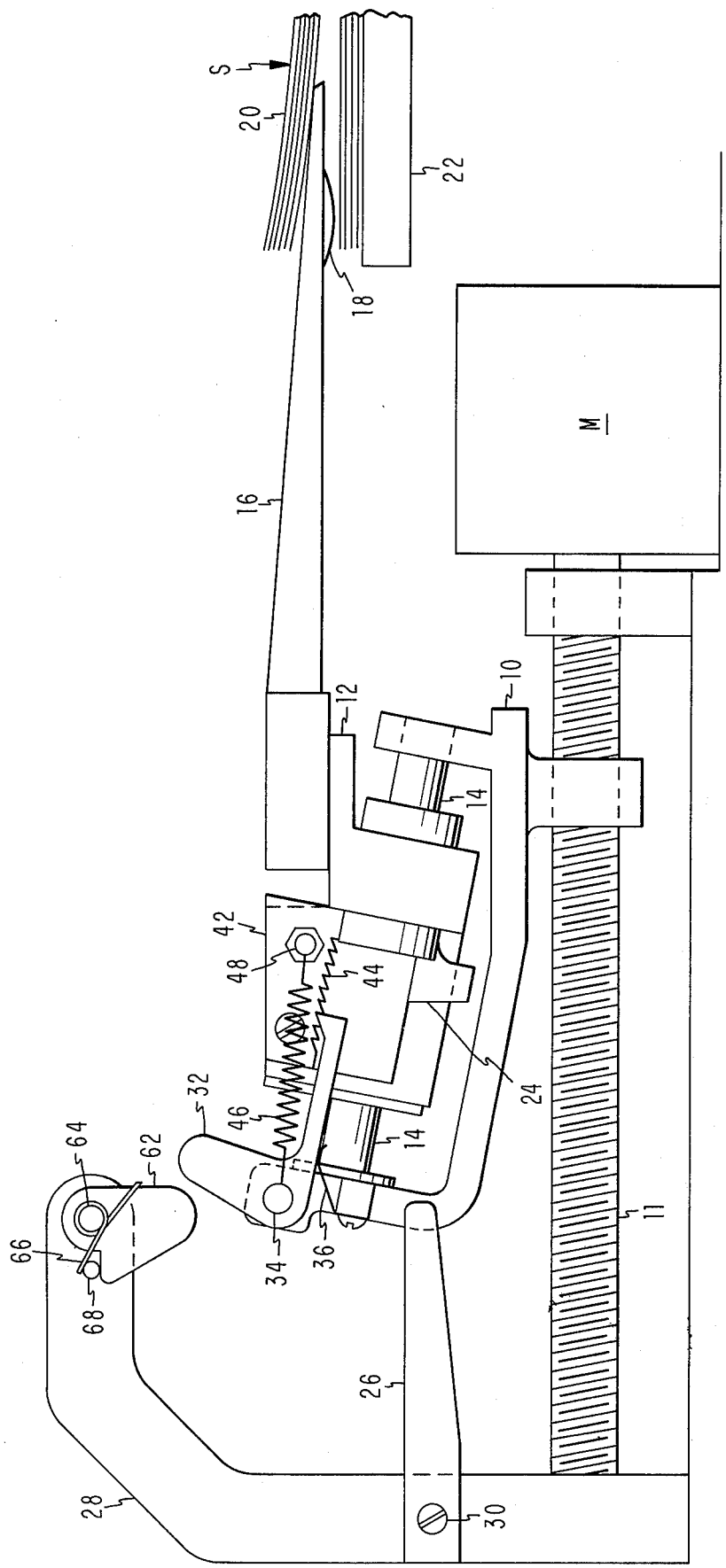
FIG. 7 is a side elevational view of a modified form of the disk file access mechanism of the invention.

In the event that a slower action of the disk file access mechanism is acceptable, the pawl 50 and the corresponding plates 58 and 70 may be omitted. This construction is shown in FIG. 7, and the operation of the FIG. 7 modification is the same as that of the form shown in FIGS. 1–6 except that the action of the pawl 50 is dispensed with.

It will be noted that both vertical and horizontal access motion are provided to the access arm 16 and magnetic head 18 by means of the single prime mover (motor M and screw 11). This results in greater reliability of accessing, a lower initial cost of the mechanism and a reduced unit size. It will be apparent that any other means for providing accurate linear motion to the carriage 10, in lieu of the electric motor M of the stepping type and the screw 11, might be used.

We claim:

1. An access mechanism for a stack of rotatable disks comprising a first carriage, a first way defining means moveably mounting said carriage for movement in opposite directions toward and away from said disk stack, an access arm and a magnetic head carried thereby for entering the disk stack, a second carriage on which said arm is fixed, second way defining means carried by said first carriage and mounting said second carriage for movement with respect to said first carriage, said second way defining means extending at an acute angle with respect to said first way defining means and the directions of movement of said first carriage, means for selectively moving said first carriage toward and away from said disk stack along said first way defining means, and a fixed stop in the path of movement of said second carriage as said two carriages move together away from said disk stack, said stop being placed so that said second carriage contacts said stop only after said two carriages have moved sufficiently away from said disk stack so that said access arm is outside of the disk stack, and means for fixing said second carriage and thereby said access arm with respect to said first carriage just subsequent to said second carriage contacting said stop and as said first carriage reverse its direction of movement to move toward said disk stack, whereby upon movement of said first carriage away from said disk stack said second carriage contacts said stop and is moved along said second way defining means to move said access arm axially of said disk stack and whereby upon subsequent movement of said first carriage toward said disk stack said second carriage is fixed with respect to said first carriage, and said access arm and said magnetic head move to a selected place in said disk stack.

2. An access mechanism for a stack of rotatable disks as set forth in claim 1, said means for fixing said second carriage and thereby said access arm with respect to said first carriage including a pawl and means rotatably mounting said pawl on one of said carriages and ratchet teeth carried by and fixed with respect to the other of said carriages with which the pawl engages to determine the location of said second carriage and thereby said access arm with respect to said first carriage.

3. An access mechanism for a stack of rotatable disks as set forth in claim 2 and including a spring connecting said two carriages together whereby said second carriage moves along said second way defining means against the action of the spring upon contact with said stop and whereby said pawl engaging with said ratchet teeth and acting against said spring holds said second carriage in a new position with respect to said first carriage during movement of said first carriage toward said disk stack after the movement of said first carriage away from said disk stack.

4. An access mechanism for a stack of rotatable disks as set forth in claim 3, and including a pawl knockoff lever and means rotatably mounting said pawl knockoff lever on a fixed center so disposed that said pawl engages the lever when said first carriage is moved away from said stack of disks to a position where said access arm is outside the periphery of the stack of disks for releasing the pawl with respect to said ratchet teeth, said pawl knockoff lever being rotatable in a direction toward said stack of disks whereby said pawl passes over the lever and remains engaged with one of said ratchet teeth as said two carriages are moved toward said disk stack after said second carriage has engaged said stop.

5. An access mechanism for a stack of rotatable disks as set forth in claim 3 and including a second pawl and means rotatably mounting said second pawl on said first carriage and second ratchet teeth carried by said second carriage, said first named pawl being rotatably mounted on said first carriage and said first named ratchet teeth being fixed on said second carriage, said second pawl and said second ratchet teeth engaging for a relative movement between said second carriage and said first carriage in a direction opposite to that for which said first named pawl and its said ratchet teeth engage whereby, as said access arm is moved into said disk stack, said second pawl is in engagement with its ratchet teeth and prevents an overshoot of said magnetic head with respect to the disk of said stack on which the magnetic head is to transfer information.

6. An access mechanism for a stack of rotatable disks as set forth in clain 5 and including a pawl knockoff lever and means rotatably mounting said pawl knockoff lever on a center which is fixed at a place removed from said disk stack so that said first named pawl moves into engagement with the pawl knockoff lever to disengage this pawl when said first carriage is moved away from said disk stack to a position outside the periphery of said disk stack, said mounting means for said rotatable pawl knockoff lever allowing the pawl knockoff lever to swing out of the way of said first named pawl when said first carriage is moved back toward said disk stack, and a fixed cam disposed so that said second pawl engages with the cam during movements of said first carriage toward and away from said disk stack in which said access arm is outside the periphery of said disk stack so that said second pawl is disengaged during such movements of said first carriage, and spring means for re-engaging said two pawls with respect to their ratchet teeth when said first carriage is moved toward said disk stack and said access arm is inside the periphery of said disk stack.

* * * * *